United States Patent [19]
Daiber et al.

[11] Patent Number: 5,183,342
[45] Date of Patent: Feb. 2, 1993

[54] LUBRICATED BEARING ASSEMBLY

[75] Inventors: Paul C. Daiber, Cincinnati; Anthony P. Greenwood, Mason, both of Ohio; Ted E. Bailey, Ann Arbor, Mich.

[73] Assignee: General Electric Company, Cincinnati, Ohio

[21] Appl. No.: 807,339

[22] Filed: Dec. 16, 1991

[51] Int. Cl.$^5$ .................. F16C 33/06; F16C 33/60
[52] U.S. Cl. .................. 384/475; 384/462; 384/506
[58] Field of Search .......... 384/462, 465, 466, 467, 384/474, 475, 499, 506

[56] References Cited

U.S. PATENT DOCUMENTS

| | | | |
|---|---|---|---|
| 3,195,965 | 7/1965 | Van Dorn | 384/475 |
| 3,269,786 | 8/1966 | Diver et al. | |
| 3,531,167 | 9/1970 | Edge et al. | |
| 4,334,720 | 6/1982 | Signer | |
| 4,384,749 | 5/1983 | Schaefer | |
| 4,463,994 | 8/1984 | Eliason et al. | |
| 4,479,682 | 10/1984 | Oliver | 384/475 |
| 4,797,014 | 1/1989 | Nicolich | 384/490 |
| 4,858,427 | 8/1989 | Provenzano | 60/39.08 |
| 4,932,500 | 6/1990 | Smith et al. | 184/5.1 |

Primary Examiner—Thomas R. Hannon
Attorney, Agent, or Firm—Jerome C. Squillaro

[57] ABSTRACT

A bearing assembly includes a split inner race disposed on a distal end of an output shaft disposed coaxially about an input shaft. A plurality of bearing elements are disposed around the inner race, with a stationary outer race surrounding the elements. The inner race includes a plural number $A_1$ of radially extending splitline channels in flow communication with a circumferential splitline manifold between the inner race and the output shaft distal end. A first half of the inner race includes a plural number $B_1$ of radially extending first channels disposed in flow communication with a circumferential first manifold defined between the inner race first half and the output shaft distal end for channeling oil to the cage. The output shaft distal end includes a number $A_2$ of axial splitline feed groves joined in flow communication with a respective number of radial splitline feed holes therein for channeling oil to the splitline maniflod, and a number $B_2$ of axial first-manifold feed grooves joined in flow communication with a respective number of radial first-manifold feed holes therein for channeling oil to the first manifold. The numbers $A_2$ and $B_2$ are less than $A_1$ and $B_1$, respectively.

6 Claims, 2 Drawing Sheets

LUBRICATED BEARING ASSEMBLY

TECHNICAL FIELD

The present invention relates generally to gas turbine engines, and, more specifically, to lubricated bearings therein.

BACKGROUND ART

A conventional bearing assembly typically used in a gas turbine engine includes a split inner race mounted on a rotary shaft, a stationary outer race, and a plurality of bearing elements such as ball bearings supported therebetween and circumferentially spaced apart by a conventional cage. A plurality of circumferentially spaced apart splitline oil channels extend radially through the inner race at the splitline for channeling oil for lubricating the bearing elements and cooling the inner race. The splitline oil channels are typically provided with oil from a respective number of axial grooves disposed in the inner surface of the inner race, with each splitline channel being fed oil from a respective axial groove to ensure a continuous supply of oil uniformly around the inner race without any one splitline channel running dry.

The cage includes forward and aft surfaces spaced radially above respective portions of the inner race halves which may be typically lubricated by oil being channeled through radial holes in the inner race. Each of these radial holes is typically disposed in flow communication with a respective axial groove in the inner race for ensuring a continuous flow of oil therethrough.

In one advanced bearing assembly being developed, the bearing elements have a speed rating of about $2.3 \times 10^6$ DN which is a very high speed requiring suitable lubrication to ensure a suitable life for the bearing assembly. Since this bearing assembly has a relatively large diameter, a relatively large number of splitline channels and radial holes are required to reduce the circumferential spacing between adjacent holes for more uniform lubrication and cooling of the bearing assembly. Furthermore, since the oil must be channeled past the splitline and splitline channels, suitable provision must be provided to ensure that the oil is not diverted by leakage through the splitline or flow through the splitline channels before being channeled to the radial holes. In an exemplary design, 24 splitline channels are being considered, along with 8 radial holes through each of the inner race halves for channeling oil to the respective cage forward and aft ends. Accordingly, conventional practice requires 40 axial grooves which would typically be circumferentially spaced apart on centers at about 9°. This substantial number of axial grooves increase the cost of manufacture, reduces the contact area between the inner race and the shaft being supported thereby, and provides stress concentrations which must be recommended for ensuring suitable bearing life.

OBJECTS OF THE INVENTION

Accordingly, one object of the present invention is to provide a new and improved lubricated bearing assembly.

Another object of the present invention is to provide a bearing assembly having a reduced number of oil channeling axial grooves while still providing uniform flow of oil to inner race splitline channels and radial holes.

Another object of the present invention is to provide a lubricated bearing assembly having a reduced number of axial grooves relative to the number of splitline channels and radial holes for reducing stress in the assembly.

Another object of the present invention is to provide a bearing assembly which channels oil past the inner race splitline to the radial holes without leakage thereof at the splitline.

DISCLOSURE OF INVENTION

A bearing assembly includes a split inner race disposed on a distal end of an output shaft disposed coaxially about an input shaft. A plurality of bearing elements are disposed around the inner race, with a stationary outer race surrounding the elements. The inner race includes a plural number $A_1$ of radially extending splitline channels in flow communication with a circumferential splitline manifold between the inner race and the output shaft distal end. A first half of the inner race includes a plural number $B_1$ of radially extending first channels disposed in flow communication with a circumferential first manifold defined between the inner race first half and the output shaft distal end for channeling oil to the cage. The output shaft distal end includes a number $A_2$ of axial splitline feed grooves joined in flow communication with a respective number of radial splitline feed holes therein for channeling oil to the splitline manifold, and a number $B_2$ of axial first-manifold feed grooves joined in flow communication with a respective number of radial first-manifold feed holes therein for channeling oil to the first manifold. The numbers $A_2$ and $B_2$ are less than $A_1$ and $B_1$, respectively.

BRIEF DESCRIPTION OF DRAWINGS

The novel features believed characteristic of the invention are set forth and differentiated in the claims. The invention, in accordance with a preferred and exemplary embodiment, together with further objects and advantages thereof, is more particularly described in the following detailed description taken in conjunction with the accompanying drawings in which:

MODE(S) FOR CARRYING OUT THE INVENTION

Figure 1:
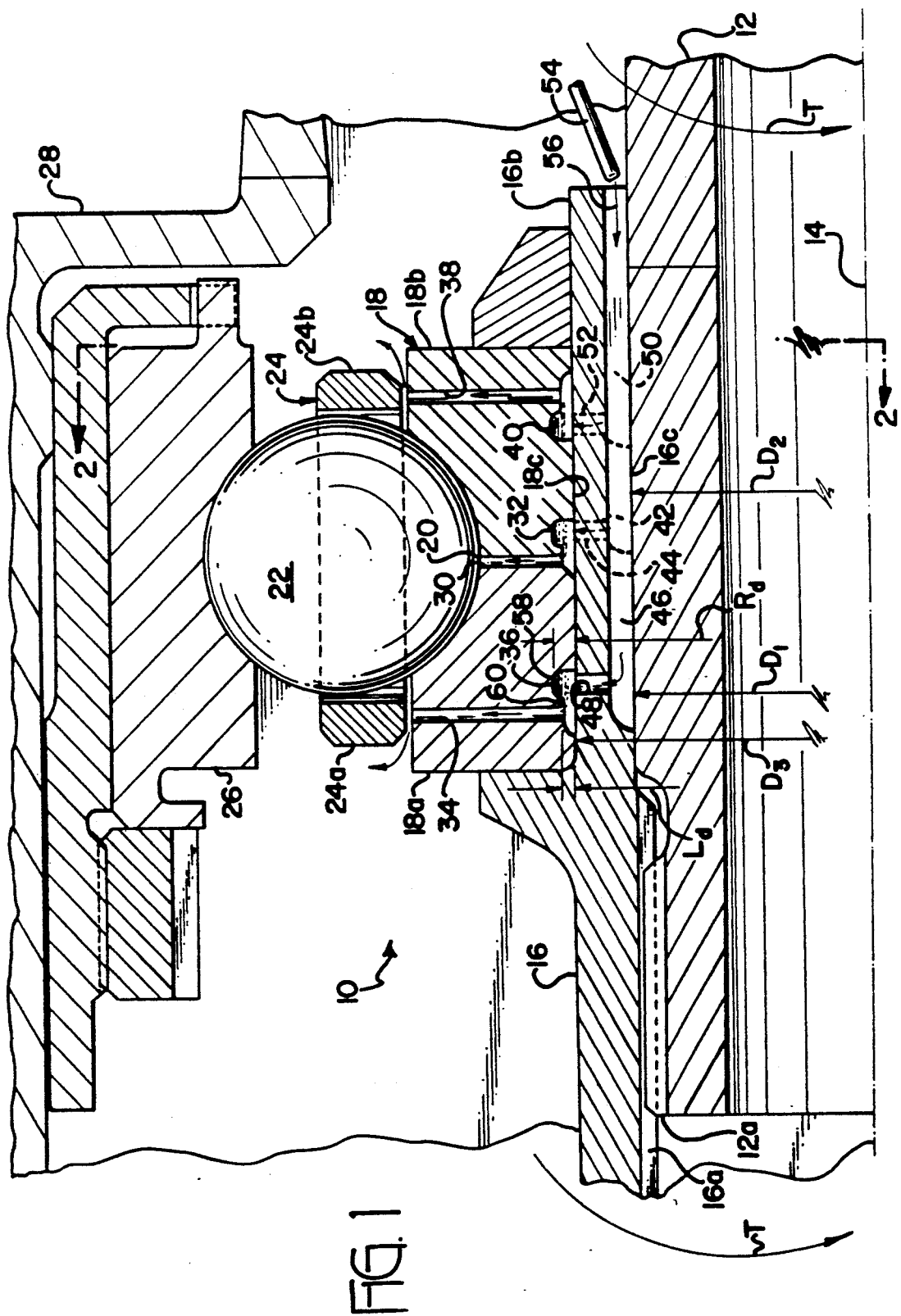
FIG. 1 is a schematic, axial sectional view of an lubricated bearing assembly in accordance with one embodiment of the present invention.

Illustrated schematically in FIG. 1 is an exemplary thrust bearing assembly 10 for a gas turbine engine in accordance with one embodiment of the present invention. A rotary input, or compressor, shaft 12 having an axial centerline axis 14 conventionally transmits torque T from a conventional high pressure compressor and high pressure turbine (not shown). A rotary output, or gear, shaft 16 is operatively joined coaxially to the input shaft 12 for receiving the torque T and transmitting it to a conventional gearbox (not shown). The input shaft 12 includes a conventional spline distal end 12a joined to a conventional splined intermediate portion 16a of the output shaft 16 for transmitting the torque T therebetween. The output shaft 16 also includes a distal end 16b disposed circumferentially on the output shaft 12 which is preferably sized to surround the output shaft 12 with a conventional interference fit. More specifically, the input shaft 12 has an outer diameter $D_1$, and the output shaft distal end 16b has an inner diameter $D_2$ which is initially smaller than the outer diameter $D_1$, by about 0.05 mm for example, so that upon conventional assembly of the distal end 16b over the output shaft 12, the interference fit is created with the resulting elastically affected diameters $D_1$ and $D_2$ being then equal.

In this way, the input shaft 12 is rigidly supported by the output shaft distal end 16b which is in turn supported by an annular bearing split inner race 18 conventionally fixedly joined on the output shaft distal end 16b for rotation therewith. The inner race 18 includes first and second halves 18a and 18b, respectively, conventionally joined or butted together at a radial plane or splitline 20. A plurality of conventional bearing elements 22, such as ball bearings, are disposed circumferentially around the inner race 18, with a conventional annular cage 24 being joined thereto for maintaining a predetermined circumferential spacing therebetween. The cage 24 includes forward and aft, or first and second, ends 24a and 24b, respectively, spaced radially above the inner race first and second halves 18a and 18b, respectively. A conventional stationary outer race 26 surrounds the bearing elements 22 and is conventionally fixedly joined to a stationary annular bearing support 28 in the gas turbine engine.

The inner race 18 includes a plural number $A_1$ of conventional circumferentially spaced apart oil splitline channels 30 extending radially therethrough at the splitline 20, which may be formed for example in the inner race first half 18a. The splitline channels 30 are disposed in flow communication at radially inner ends thereof with a circumferentially extending splitline manifold 32 defined between an inner surface 18c of the inner race 18 and the outer surface of the output shaft distal end 16b. In this exemplary embodiment, the splitline manifold 32 is formed as a recess in the circumferential inner surface 18c of the inner race 18, and in particular of the inner race second half 18b.

The inner race first half 18a includes a plural number $B_1$ of circumferentially spaced apart oil first channels 34 extending radially therethrough and below the cage first end 24a in flow communication at the radially inner ends thereof with a circumferentially extending first manifold 36 similarly defined between the inner race first half 18a and the output shaft distal end 16b, with the first manifold 36 being preferably formed as a recess in the inner surface 18c.

Similarly, the inner race second half 18b includes a plural number $C_1$ of circumferentially spaced apart oil second channels 38 extending radially therethrough below the cage second end 24b in flow communication at radially inner ends thereof with a circumferentially extending second manifold 40 defined between the inner race second half 18b and the output shaft distal end 16b. The second manifold 40 is also preferably formed as a recess in the inner surface 18c of the inner race second half 18b.

In order to channel or meter oil independently to each of the first, second, and splitline channels 34, 38, and 30, with some of the oil being channeled past the splitline 20 and splitline channels 30 to the first channels 34 without leakage or diversion, the output shaft distal end 16b is provided between the inner race 18 and the input shaft 12 as a barrier. In conventional practice, the inner race 18 would ordinarily be disposed directly on the outer surface of the input shaft 12 which would result in a simpler arrangement and a smaller diameter of inner race 18 with a correspondingly smaller DN rating. The output shaft distal end 16b would then conventionally end at the intermediate splined portion 16a of the output shaft 16 without extending under the inner race 18. However, and in accordance with a preferred embodiment of the present invention, the distal end 16b extends under the inner race 18 for both supporting the inner race 18 on the input shaft 12 and for providing means to deliver oil independently to each of the first, second, and splitline channels 34, 38, and 30 in an improved arrangement.

More specifically, the output shaft distal end 16b includes a number $A_2$ of circumferentially spaced apart, axially extending splitline feed grooves 42 disposed in an inner surface 16c thereof and joined in flow communication with a respective number of splitline feed hoes 44 extending radially through the output shaft distal end 16b for channeling oil to the splitline manifold 32. The splitline feed grooves 42 and feed holes 44 are illustrated in dashed line in FIG. 1, with exemplary ones of which being shown in solid line in FIG. 2.

Figure 2:
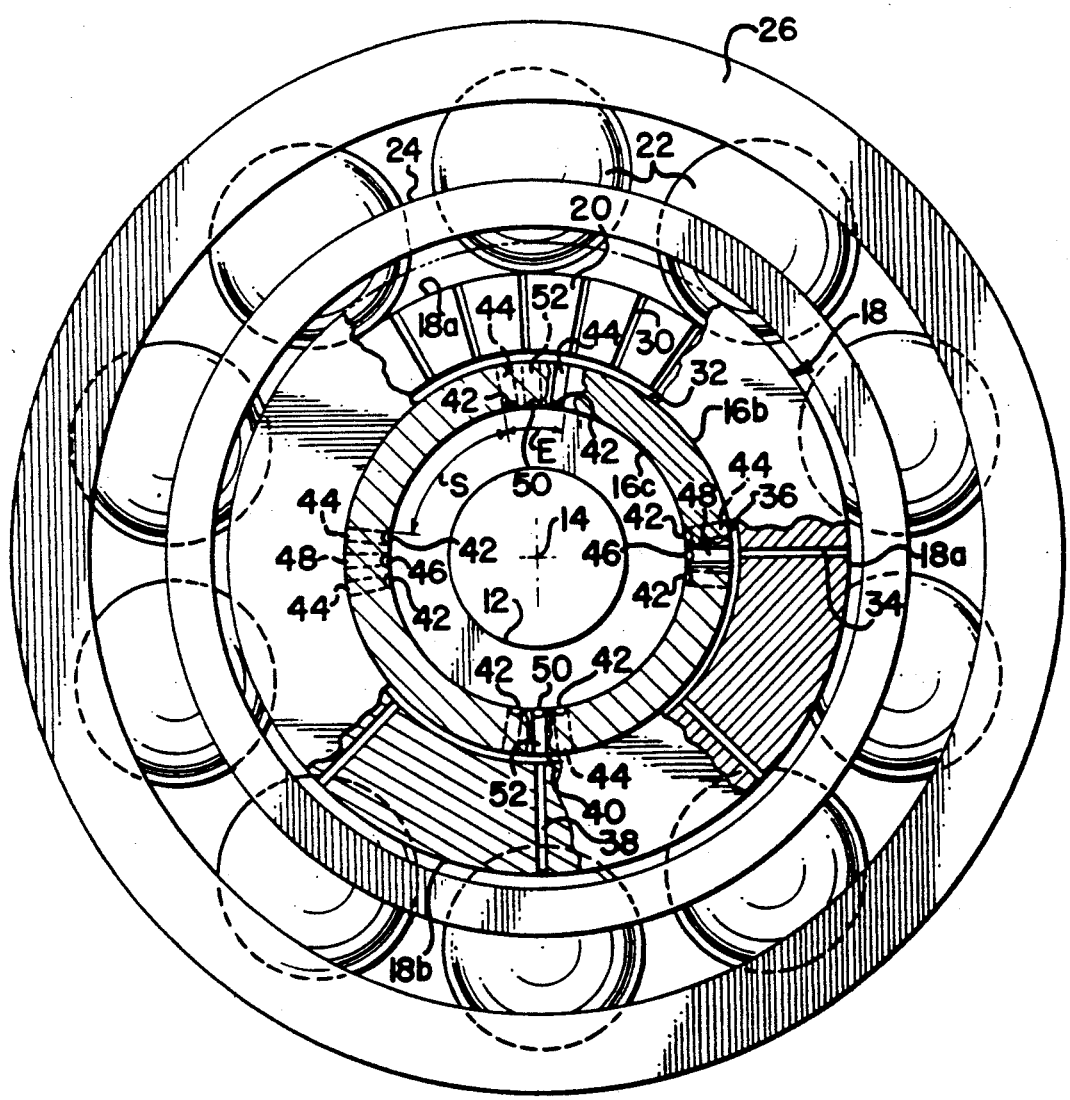
FIG. 2 is a radial, partly sectional view of the bearing assembly illustrated in FIG. 1 taken along line 2—2.

Similarly, a number $B_2$ of circumferentially spaced apart, axially extending first-manifold feed grooves 46 are disposed in the inner surface 16c between the splitline feed grooves 42 (as shown in FIG. 2), and in flow communication with a respective number of first-manifold feed holes 48 extending radially through the output shaft distal end 16b for channeling oil axially over or past the splitline 20 and then radially outwardly to the first manifold 36.

Similarly, the output shaft distal end 16b further includes a number $C_2$ of circumferentially spaced apart, axially extending second-manifold feed grooves 50 disposed in the inner surface 16c between the splitline and first-manifold feed grooves 42 and 46 (as shown in FIG. 2) and in flow communication with a respective number of second-manifold feed holes 52 extending radially through the output shaft distal end 16b to channel oil to the second manifold 40.

As shown in FIG. 1, conventional means in the form of a stationary oil-jet nozzle 54 conventionally injects oil 56 into the aft ends of all of the feed grooves 42, 46, and 50 for flow axially under the inner race 18 from the inner race second half 18b to the inner race first half 18a. Since the output shaft distal end 16b rotates with both the input shaft 12 and the inner race 18 relative to the stationary nozzle 54, the oil 56 is uniformly injected or metered into all of the feed grooves 42, 46, and 50. A portion of the oil 56 flows axially in the second-manifold feed grooves 50 to the second-manifold feed holes 52 wherein it is channeled radially outwardly by centrifugal force into the second manifold 40 and in turn into and through the second channels 38 for lubricating and cooling the cage second end 24b.

Another portion of the oil 56 is channeled axially through the splitline feed grooves 42 to the splitline feed holes 44 wherein it is channeled radially outwardly by centrifugal force into the splitline manifold 32 and in turn into and through the splitline channels 30 for lubricating and cooling the bearing elements 22. The remaining portion of the oil 56 is channeled axially through the first-manifold feed grooves 56 to the first-manifold feed holes 48 which channel the oil radially outwardly by centrifugal force into the first manifold 36 and in turn into and through the first channels 34 for lubricating and cooling the cage first end 24a. In this way, separate and independent axial feed grooves 42, 46, and 50 are provided for ensuring independent oil supply to all of the radial channels 30, 34, and 38.

In the embodiment illustrated, the outer diameter $D_1$ of the input shaft 12 has a predetermined value which is required for effectively transmitting the torque T therethrough, and therefore, may not be reduced without decreasing the effective life of the input shaft 12. Accordingly, the inner diameter $D_3$ of the inner race 18 as measured at the inner surface 18c is also relatively large, for example about 20 cm, which results in a rating speed of the bearing elements 22 of about $2.3 \times 10^6$ DN which is relatively high and at the limit of the state of the art. In order to improve the useful lifetime of the bearing assembly, the inner diameter $D_3$ should be as small as possible but, since the output shaft distal end 16b is disposed between the inner race 18 and the input shaft 12, it limits the ability to reduce the inner diameter $D_3$ since a corresponding increase in stress in the output shaft distal end 16b would result.

Accordingly, in order to utilize the output shaft distal end 16b for channeling the oil 56 to the inner race 18, and for example past the splitline 20 to the first channels 34, a fewer number of the axial feed grooves 42, 46, and 50, than the number of the respective radial channels 30, 34, and 38 may be utilized for maintaining a larger load-transmitting contact area between the distal end 16b and the input shaft 12 under the bearing inner race 18, and for reducing the number of stress concentrations in the output shaft distal end 16b while still providing the oil 56 uniformly to all of the radial channels 30, 34, and 38.

In accordance with the present invention, the number $A_2$ of the splitline feed grooves 42 is less than the number $A_1$ of splitline channels 30; the number $B_2$ of the first-manifold feed grooves 56 is less than the number $B_1$ of first channels 34; and the number $C_2$ of second-manifold feed grooves 50 is less than the number $C_1$ of second channels 38. In one embodiment of the invention, only one each of the first and second manifold feed grooves 46 and 50 need be provided for channeling oil to the first and second manifolds 36 and 40, respectively, although in the preferred embodiment of the present invention two each are provided for redundancy.

As illustrated in FIG. 2, the preferred embodiment includes eight (8) of the first channels 34 disposed 45° apart on center, with two (2) first-manifold feed grooves 46 and respective first-manifold feed holes 48 channeling the oil 56 to the first manifold 36 for feeding the first channels 34. Similarly, eight (8) of the second channels 38 are provided and spaced uniformly apart at 45° on center, with two (2) of the second-manifold feed grooves 50 and respective second-manifold feed holes 52 being provided for channeling oil to the second manifold 40 for flow to the second channels 38. And, twenty-four (24) of the splitline channels 30 are uniformly spaced apart at 15° on center, with eight (8) of the splitline feed grooves 42 and respective splitline feed holes 44 being provided for channeling oil to the splitline manifold 32 for flow to the splitline channels 30.

The splitline feed grooves 42 are preferably disposed in groups with at least one of the first-manifold feed grooves 46 and the second-manifold feed grooves 50, with each of the groups having a circumferential extent E, with adjacent ones of the groups being circumferentially spaced apart at an angular spacing S which is greater than the circumferential extent E. In this way, relatively large portions of the output shaft distal end 16b between the groups may be provided for maintaining intimate contact with the outer surface of the input shaft 12 for transmitting loads directly therebetween. The stress concentrations associated with the grooves 42, 46, and 50 will therefore be limited to the region of the groups without stress concentrations therefrom between adjacent ones of the groups.

In the preferred embodiment, each of the groups includes two of the splitline feed grooves 42 with only one of the first-manifold feed grooves 46 or second-manifold feed grooves 50 therebetween. As shown in FIG. 2, four groups of three grooves are shown spaced about 90° apart on centers. Each of the groups includes two splitline feed grooves 42, with two 180° apart groups including one first-manifold feed groove 46 centered between the splitline feed grooves 42, and the other two 180° apart groups each containing a single second-manifold feed groove 50 between the two adjacent splitline feed grooves 42. In this exemplary embodiment, the circumferential extent E of each of the groups is about 10°, with the circumferential spacing S being about 80°.

To ensure that the oil 56 flowing radially outwardly through the feed holes 44, 48, and 52, does not flow solely to the closest ones of the respective channels 30, 34, and 38, which would, therefore, starve the remaining holes of oil, each of the splitline, first, and second manifolds 32, 36, and 40 includes an annular, circumferentially extending reservoir 58 extending radially outwardly into the inner race 18 from the inner surface 18c. And, an integral circumferentially extending land 60 is spaced radially inwardly from the reservoir 58 and in flow communication with the respective splitline, first, and second channels 30, 34, and 38, respectively, so that the oil 56 from the reservoir 58 overflows the land 60 substantially uniformly into the respective splitline, first, and second channels 30, 34, and 38 by centrifugal force. The radial depth $R_d$ of the reservoir 58 radially outwardly from the inner surface 18c is predeterminedly greater than the radial depth $L_d$ of the land 60 radially outwardly from the inner surface 18c. For example, $R_d$ may be about 2 mm and $L_d$ about 1 mm. In this way, oil being centrifuged radially outwardly from the feed holes 44, 48, and 52 is initially collected in the respective reservoirs 58 of the manifolds 32, 36, and 40, and then flows axially over the respective lands 60 to the channels 30, 34, and 38. Since the lands 60 have a common diameter, the oil 56 will flow substantially uniformly from the reservoirs 58 and into all of the circumferentially spaced apart respective channels 30, 34, and 38. Accordingly, a fewer number of the axial feed grooves 42, 46, and 50 may be used for uniformly feeding the respective radial channels 30, 34, and 38.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A bearing assembly comprising:
    an input shaft for transmitting torque, and having an axial centerline axis;

an output shaft operatively joined coaxially to said input shaft for receiving said torque, said output shaft having a distal end disposed circumferentially on said output shaft;

an annular bearing split inner race fixedly joined on said output shaft distal end for rotation therewith, said inner race including first and second halves joined together at a radial splitline;

a plurality of bearing elements disposed circumferentially around said inner race;

an annular cage joined to said bearing elements to maintain a predetermined circumferential spacing therebetween and including first and second axially spaced apart ends spaced radially above said inner race first and second halves, respectively;

a stationary outer race surrounding said bearing elements;

said inner race including a plural number $A_1$ of circumferentially spaced splitline channels extending radially therethrough at said splitline in flow communication with a circumferentially extending splitline manifold defined between said inner race and said output shaft distal end;

said inner race first half including a plural number $B_1$ of circumferentially spaced first channels extending radially therethrough below said cage first end in flow communication with a circumferentially extending first manifold defined between said inner race first half and said output shaft distal end;

said output shaft distal end including:
 a number $A_2$ of circumferentially spaced, axially extending splitline feed grooves disposed in an inner surface thereof and joined in flow communication with a respective number of splitline feed holes extending radially through said output shaft distal end for channeling oil to said splitline manifold;
 a number $B_2$ of circumferentially spaced, axially extending first-manifold feed grooves disposed in said inner surface between said splitline feed grooves and in flow communication with a respective number of first-manifold feed holes extending radially through said output shaft distal end for channeling oil axially over said splitline to said first manifold; and said number $A_2$ being less than $A_1$, and said number $B_2$ being less than $B_1$.

2. A bearing assembly according to claim 1 wherein said splitline manifold and said first manifold each includes an annular reservoir extending radially outwardly into said inner race, and an integral annular land spaced radially inwardly from said reservoir and in flow communication with said respective splitline and first channels so that oil from said reservoir overflows said land substantially uniformly into said respective splitline and first channels by centrifugal force.

3. A bearing assembly according to claim 2 wherein:
said inner race second half includes a plural number $C_1$ of circumferentially spaced second channels extending radially therethrough below said cage second end in flow communication with a circumferentially extending second manifold defined between said inner race second half and said output shaft distal end;
said output shaft distal end further includes a number $C_2$ of circumferentially spaced, axially extending second-manifold feed grooves disposed in said inner surface between said splitline and first-manifold grooves in flow communication with a respective number of second-manifold feed holes extending radially through said output shaft distal end for channeling oil to said second manifold; and said number $C_2$ is less than $C_1$.

4. A bearing assembly according to claim 3 wherein said output shaft distal end is sized to surround said output shaft with an interference fit.

5. A bearing assembly according to claim 3 wherein said splitline feed grooves are disposed in groups with at least one of said first-manifold feed grooves and said second-manifold feed grooves, each of said groups having a circumferential extent, with adjacent ones of said groups being circumferentially spaced apart at an angular spacing greater than said circumferential extent.

6. A bearing assembly according to claim 5 wherein each of said groups includes two of said splitline feed grooves and only one of said first-manifold feed grooves or said second-manifold feed grooves.

* * * * *